United States Patent [19]
Traska et al.

[11] Patent Number: 5,202,147
[45] Date of Patent: Apr. 13, 1993

[54] PEANUT BUTTER AND A METHOD FOR ITS PRODUCTION

[75] Inventors: Alexander Traska, Ellicott City; Frank A. DiSciullo, Baltimore, both of Md.

[73] Assignee: Van den Bergh Foods Co., Division of Conopco, Inc., Lisle, Ill.

[21] Appl. No.: 495,251

[22] Filed: Mar. 16, 1990

[51] Int. Cl.⁵ .................................. A23L 1/00
[52] U.S. Cl. ........................ 426/633; 426/524; 426/564
[58] Field of Search .............. 426/633, 564, 519, 474, 426/524

[56] References Cited

U.S. PATENT DOCUMENTS

| | | | |
|---|---|---|---|
| 1,921,275 | 8/1933 | Werner et al. | 426/564 |
| 2,834,682 | 5/1958 | Zuckerman | 426/633 |
| 2,911,303 | 11/1959 | Rowland et al. | 426/633 |
| 2,970,917 | 2/1961 | Melnick | 426/564 |
| 2,976,154 | 3/1961 | Brown et al. | 426/564 |
| 3,226,905 | 1/1966 | Richardson et al. | 52/666 |
| 3,265,507 | 8/1966 | Japikse | 426/633 |
| 3,266,905 | 8/1966 | Baker et al. | 426/633 |
| 3,556,812 | 1/1971 | Krohn | 426/572 |
| 3,619,207 | 11/1971 | Dzurik et al. | 426/633 |
| 3,637,402 | 1/1972 | Reid et al. | 426/474 |
| 3,772,038 | 11/1973 | Ayres et al. | 426/633 |
| 3,821,448 | 6/1974 | Parker et al. | 426/633 |
| 3,843,821 | 10/1974 | Glabe et al. | 426/378 |
| 3,882,254 | 5/1975 | Gooding | 426/633 |
| 3,903,311 | 9/1975 | Billerbeck et al. | 426/633 |
| 3,904,769 | 9/1975 | Sair et al. | 426/104 |
| 3,978,246 | 8/1976 | Chozianin et al. | 426/633 |
| 4,004,040 | 1/1977 | Puta | 426/564 |
| 4,140,736 | 2/1979 | Nielsen et al. | 261/30 |
| 4,272,558 | 6/1981 | Bouette | 426/660 |
| 4,476,148 | 10/1984 | Harris | 426/519 |
| 4,542,029 | 9/1985 | Caner et al. | 426/127 |
| 4,581,378 | 4/1986 | Lazar et al. | 514/681 |
| 4,814,195 | 3/1989 | Yokoyama et al. | 426/633 |
| 4,828,868 | 5/1989 | Lasdon et al. | 426/633 |
| 4,863,753 | 9/1989 | Hunter et al. | 426/633 |
| 4,915,967 | 4/1990 | Nozaka | 426/489 |
| 4,919,964 | 4/1990 | Adams et al. | 426/564 |
| 5,079,027 | 1/1992 | Wong et al. | 426/633 |

FOREIGN PATENT DOCUMENTS

| | | |
|---|---|---|
| 519511 | 3/1940 | United Kingdom . |
| 1196286 | 6/1970 | United Kingdom . |

OTHER PUBLICATIONS

Freeman et al, "Peanut Butter" published by the Southern Regional Research Laboratory, New Orleans, Louisiana, Mar., 1954 (pp. 7–14).

Morris et al, "The Effect of Roasting on the Palatability of Peanut Butter", Food Technology, 1954, vol. VIII, No. 8 (pp. 377–380).

Wise "Food Oils and Their Uses" (6, 2nd Edition, pp. 252–253.

*Primary Examiner*—George Yeung
*Attorney, Agent, or Firm*—Gerard J. McGowan, Jr.

[57] ABSTRACT

A method of preparing a whipped peanut butter, the peanut butter produced thereby and the peanut butter packaged in a container. The peanut butter is made by uniformly dispersing nitrogen or a similar inert gas, into a peanut butter mass for the purpose of producing a whipped and aerated peanut butter having a 10 to 50 percent aeration. The effect of inert gas incorporation along with the rapid chilling and whipping process employed in this invention is a substantially softer and more spreadable peanut butter. Additionally, the whipped peanut butter has a uniquely pleasing mouthfeel with reduced stickiness and cling to mouth-parts.

Since aeration has a direct effect on the finished peanut butter color and flavor, one aspect of the process pertains to the inclusion of powdered molasses and/or the selection of peanuts roasted to a particular L-value to compensate for the lighter color and lower flavor intensity produced by the incorporation of nitrogen or similar gases. The packaging system provides for maximum protection of whipped product from textural defects, e.g. pull-away, cracking, yet offering good protection against flavor loss.

28 Claims, 3 Drawing Sheets

PEANUT BUTTER AND A METHOD FOR ITS PRODUCTION

BACKGROUND OF THE INVENTION

Peanut butter is widely enjoyed and finds a variety of uses. The most common use of peanut butter is in preparing sandwiches. Other uses include dipping and eating the peanut butter directly from a container with a spoon or with edible carriers such as crackers or vegetable pieces. To a lesser degree, peanut butter is used in a variety of baking and cooking applications. Product characteristics which are responsible for peanut butter's wide acceptance and popularity are its flavor, its good nutritional properties and its suitability for consumption alone or in combination with a variety of other foods.

Since the most common uses of peanut butter call for spreading and dipping, it is paramount that the product be of a soft consistency and be easily spreadable to avoid tearing bread or crumbling crackers. Additionally, since children are the largest group of peanut butter users, a soft and spreadable product will help to facilitate the application of peanut butter to bread, crackers and the like by this group without the need for assistance from parents.

As much as peanut butter is liked and appreciated, it does have the annoying property of being quite cohesive and, as a consequence, has a tendency to stick and cling to mouth-part during eating. For this reason, peanut butter has sometimes been identified or classified as a "choke" food. This inherent characteristic of adhesiveness often bars the use of peanut butter by the very young and the very old.

The two important product characteristics of improved spreadability and softness along with reduced adhesiveness, have been addressed in peanut butter for many years as evidenced by the large volume of technical literature and patents covering this subject. Despite such efforts, only modest, incremental improvements have been realized to date in the area of improved spreadability and reduced stickiness in peanut butter.

It is known to aerate peanut butter to affect its properties. However, it is also known that incorporation of gas will proportionately and significantly lighten the color and reduce or dilute the flavor impact of the peanut butter.

Prior disclosures of whipped or aerated peanut butter-type products do not appear to have addressed adjustment to either color or flavor loss caused by the incorporation of inert gases, which renders such a product atypical and inferior to standardized, widely accepted and popular peanut butter.

Previously proposed formulations and methods for producing a whipped peanut butter, either of the creamy or crunchy variety or style, have not been entirely satisfactory. For one, the prior formulations have often called for use of gelatin or other thickening agents along with significantly higher levels of hydrogenated and/or partially hydrogenated high melting vegetable oils than those found in conventional peanut butters, to help stabilize the aerated product matrix. The choice of such stabilizers and/or their usage level excluded such products from FDA Standards for real peanut butter, placing them into either a peanut spread, artificial peanut butter or other descriptive and fanciful name category.

Conventional peanut butters utilize from 1.0 to 1.4 percent of a high melting (145°-155° F.) vegetable oil stabilizer primarily to reduce liquid oil separation. Somewhat higher levels of a lower melting point hardened vegetable oil stabilizer may also be used. Prior art disclosures of aerated peanut butters have utilized higher levels of high melting vegetable oil stabilizer above and beyond that required to prevent oil separation. These disclosures reveal such usage levels of 2 to 10% of a partially hydrogenated vegetable oil stabilizer to not only control oil separation but to stabilize the aerated product matrix.

It is quite apparent to those having even limited familiarity with peanut butter that use of a 2 to 10 percent level of high melting vegetable oil stabilizers, disclosed previously, will negatively affect the melt-down characteristic of a whipped product making it waxy and gummy along with reducing its spreadability. Such technical approaches, in essence, negate the very benefits of improved mouth-feel and spreadability sought through the use of aeration of conventional peanut butter or like products.

It has also been discovered that textural defects such as product pull-away from the container and/or product (i.e., peanut butter) cracking are encountered when whipped peanut butters are placed in certain containers such as those made of standard glass, polyethylene terephthalate or thin walled high density polyethylene (H.D.P.E.) having a wall thickness of 0.020 inches or less.

SUMMARY OF THE INVENTION

In a first aspect, the present invention relates to a method of aerating a peanut butter to produce a peanut butter having significantly improved softness and spreadability and reduced adhesiveness and stickiness during mastication and swallowing. According to the first aspect of the invention, a molten mass of peanut butter is subjected to pressures of about 200 to about 500 psi, rapidly deep chilled, injected with an inert gas and passed through a narrow orifice. Preferably, the orifice is from 15 to 120 square millimeters of circular or rectangular design. The pressure on the other side of the orifice is within the range of from about 0 to about 80 psi. The peanut butter thus prepared may then be whipped.

It is believed that the improved spreadability and the reduced adhesiveness results at least in part from the particle size of the inert gas cells. These are believed to be generally in the range of from 10 to 300 microns in diameter, preferably 10 to 200 microns, especially from 10 to 100 microns. In particular, it is thought to be preferred that the median particle size be within these ranges and that no cell exceed 300 microns. It is also thought to be preferred that 25% of the cells are 50 microns in diameter or less, 75% of the cells are 150 microns or less and 100% of the cells have a diameter of 300 microns or less.

Further aspects of the invention relate to the problem of reduced color and flavor resulting from aeration of peanut butter. In accordance with one of these aspects of the invention, dried powdered molasses is used to maintain the typical color of peanut butter notwithstanding the aeration. Dried powdered molasses has the added benefit of acting as a flavor adjunct. Furthermore, in accordance with another aspect of the invention, peanuts roasted to a particular level of darkness are used to bring the whipped peanut butter into the color range of conventional peanut butters. Moreover, the deeper, dark roasted peanuts preferred herein not only contribute a darker, richer color, but also provide a higher flavor intensity to the peanuts used in the formulation of the whipped peanut butter.

As a supplement and to boost further the flavor intensity, a high flavor peanut oil may be used in accordance with this invention. The high flavor peanut oil is obtained by the extraction of oils from dark roasted peanuts, preferably peanuts roasted to the color levels set forth hereinbelow. An example of a high flavor peanut oil suitable for use herein is the high flavor peanut oil extracted from dark roasted peanuts supplied by Food Materials Corp., Chicago, Ill. 60618. The high flavored peanut oil may be added at levels of 0.5 to 3.0%.

Another aspect of the invention is directed to the use of thick-walled, opaque high density polyethylene (H.D.P.E.) or polypropylene (P.P.) containers, preferably in tub form, and which are preferably membrane sealed and capped. These have been found to be of particular benefit for packaging whipped peanut butter. It has been discovered that through the use of such packaging materials for whipped peanut butter, a significant reduction in the incidence of textural defects such as product pull-away from containers and/or cracking of product has been observed in comparison to the standard glass, PET containers or thin walled H.D.P.E. containers having a wall thickness of 0.020 inches or less.

The thick-walled H.D.P.E. and P.P. containers of the invention in combination with foil or other low permeability factor membrane seals provide good protection against oxidative flavor deterioration by offering good barrier properties against oxygen transmission and by shielding the whipped peanut butter from light sources. Both of these environmental influences serve to promote and accelerate rancidity in peanut butter. The preferred wall-thickness of both H.D.P.E. and P.P. tub containers is 0.040±0.015 inches.

DETAILED DESCRIPTION OF THE INVENTION

The peanut butter of the invention may include high melting vegetable oil stabilizers of palm, cottonseed and similar vegetable oil origins at a level of from 0.5 to 10 percent, preferably from 1 to 5%. It is especially preferred that the high melting (145°-155° F.) vegetable oil stabilizer levels, especially of palm, cottonseed and similar vegetable oil origins, be from 1.2 to 1.4 percent, i.e., in the same range of stabilizer usage as found in many premium quality peanut butter found in today's market.

The preferred compositions of this invention fully comply with the FDA standard of identity for peanut butter These require that the standardized product contain a minimum of 90 percent ground roasted peanuts and no more than 10 percent of optional seasoning and stabilizing ingredients such as salt, nutritive sweeteners and hydrogenated vegetable oils and emulsifiers such as mono- and diglycerides. Alternatively, however, if desired, the invention may be used to make other products which would be known as peanut spreads, artificial peanut butter or under other names. The percent by weight of peanuts can range from upward of 50%, from 50 to 90% for nonstandard spreads and from 90 to 95% and higher for standard peanut butters.

Figure 1:
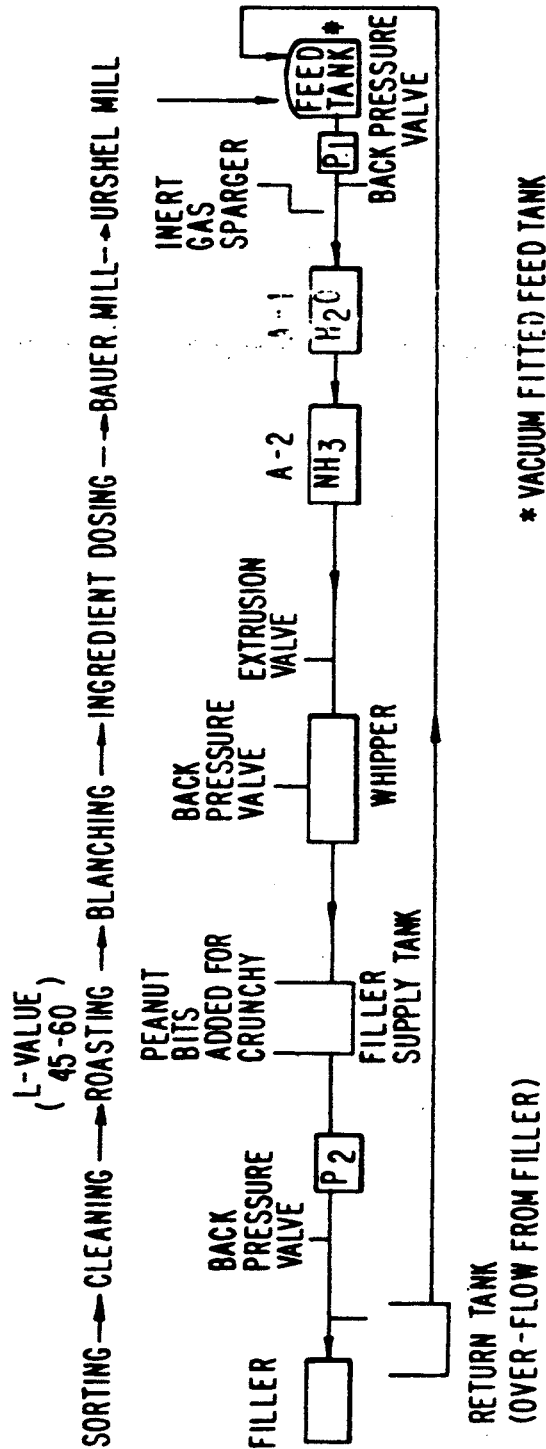
FIG. 1 is a flow diagram for a process for making the aerated, whipped peanut butter of the invention.

Steps in a process of making the peanut butter of the invention can be followed in the flow diagram of FIG. 1. Preliminary steps in the process include sorting and cleaning of the peanuts. In accordance with one aspect of the invention, the peanuts used to prepare the whipped peanut butter are those which have been roasted to an L-value of from 45–60, preferably from 52 to 56, using the Hunter color meter. The Hunter colorimeter is available from Hunter Laboratories in Reston, W. Va. As is known to those skilled in the art, the L-value is a measure of the coloration of the peanuts. As indicated above, such L-values are preferred for imparting to the whipped peanut butter a color and taste similar to traditional peanut butters.

The peanuts having the appropriate L-value are blanched and combined with seasonings and stabilizers. Appropriate seasonings and stabilizing ingredients include the following and combinations thereof: salt, sugar, liquid sugar, dextrose, honey, fructose, corn syrup, medium invert and invert sugars, maple syrup, molasses, liquid or powder, peanut oil, particularly high flavor oil extracted from roasted peanuts, vegetable oils, fractionated vegetable oils and partially hydrogenated vegetable oils, including soybean, palm, coconut, cottonseed, corn, rapeseed, canola and peanut oils, saturated and unsaturated mono- and diglycerides and lecithin, polyglycerol esters and other food emulsifiers. It is preferred that the seasonings and stabilizing ingredients added to the dark roasted peanuts do not exceed the 10% limit imposed by the Standards of Identity for peanut butter. In particular, the seasonings and stabilizers preferably constitute from 0.5 to 10%.

As indicated above, in accordance with another aspect of the invention, dried powdered molasses, is added to improve the color of the final product. A suitable powdered molasses is MC-71, which is granulated so that 90% will pass though #100 U.S. standard sieve, supplied by Sethness Co., Chicago, Ill. 60647.

It is particularly preferred that the peanut butter of the invention contain less than 3%, especially from 1.0 to 1.4% of a high melting (145°-155° F.) vegetable oil stabilizer to reduce liquid oil separation.

The mixture of peanuts, seasonings and stabilizers is ground into a fine paste via the use of milling equipment which is standard in the peanut butter industry, such as a Bauer and/or an Urshel mill. The milled peanut butter paste is collected in a standard feed or supply tank fitted with a vacuum system to de-aerate the milled paste from any entrapped or entrained atmospheric air. This vacuum-fitted tank also serves to remove the inert gases from any aerated or whipped peanut butter which it may be desired to return to the tank as excess product from the whipped peanut butter filling line. This feature assures that the peanut butter mass fed into the system is essentially gas free before entering or re-entering the inert gas sparging/chilling/expansion whipping process system. A return tank for accommodating overflow from the filler is shown in the flow diagram of FIG. 1. The temperature of the peanut butter mass at the vacuum-fitted feed tank is preferably 155° F. so that a hot molten peanut butter mass is produced.

The hot molten peanut butter mass with a temperature range of from 140° F. to 170° F. is pumped from the vacuum-fitted feed tank through the entire process system. To accomplish this, the pump (P1 in FIG. 1) must be able to pump uniformly against pressures of 200-500 psi which can be generated by the process of this disclosure. An appropriate high pressure pump is a Moyno pump, available from the Moyno Pump Division of Robbins & Myers, Inc., Springsfield, Ohio 45501.

After leaving the vacuum-fitted feed tank, the 140°-170° F. molten peanut butter mass is pumped via the high pressure pump, such as the Moyno pump to a Votator-type scraped surface heat exchanger (S.S.H.E.). The S.S.H.E. may be fitted with two or more chilling tubes in which the coolant may be chilled water and/or liquid ammonia. In the S.S.H.E. the molten peanut butter is rapidly chilled to a temperature range of 35° to 50° F., preferably 40° F. The heat exchanger is designated A-1 (pre-cooling) and A-2 (deep cooling) in FIG. 1.

At any point between the high pressure pump such as a Moyno and the last chilling tube of the S.S.H.E., inert gas is injected into the peanut butter flow. The pressure of the inert gas being sparged or injected into the peanut butter flow must exceed the back-pressure of the product by about 50 psi. Therefore, since the operating back-pressure of the system at this point may be from 200 to 500 psi, the operating pressure for the nitrogen sparging or injection system generally operates at 250 to 550 psi. This assures positive and uninterrupted flow of inert gas into the peanut butter flow. A gas flow meter or manometer is adjusted to vary the flow of inert gas to the desired over-run or inert gas content within the 10 to 50 percent range by volume. The preferred inert gas content range of the whipped peanut butter disclosed here is from 10 to 50 percent, especially 20 to 30 percent. The preferred inert gas is nitrogen. Other inert gases which may be suitable include helium, argon, xenon, nitrous oxide and carbon dioxide. Plain air is not recommended.

The stabilization of the aerated product matrix of the invention is primarily accomplished via the use of the very low chilling temperatures, preferably 40° F. of the hot peanut butter mixture containing 10 to 50 percent inert gases, and by filling the aerated and whipped peanut butter preferably at a 55° F. temperature.

After the chilled peanut butter mass containing the preferably 10 to 50 percent nitrogen or other inert gas exits the S.S.H.E., it is passed through a narrow orifice such as an extrusion value or similar device. This constriction is utilized to create a pressure drop at this point of the process to allow for the expansion of the inert gas to occur. More specifically, the inert gas is dissolved in the peanut butter mass on the high pressure side of the process system, which is operating at the high pressures of 200-500 psi. After the product exits the extrusion valve, the pressure is reduced to a range of from 0 to 80 psi, preferably 0 to 30 psi, and the dissolved inert gas becomes gaseous in form.

The peanut butter containing the inert expanded gas is passed into a high speed whipper or blender which reduces and re-distributes the inert gas bubbles, which come out of solution, uniformly throughout the peanut butter mass. Preferably the whipper operates at from 100 to 1000 rpm. The whipped peanut butter exiting the whipper, such as a Cherry Burell or CR mixer can enter the filler directly or go into an agitated filler hopper tank. Cherry Burrell and CR mixers are available from Cherry-Burrell, Process Equipment Division, Louisville, Ky. 40232. From the filler hopper tank, the product can then be pumped to the filler. This second option is useful for incorporating peanut or other type bits into the whipped peanut butter in the agitated hopper to produce a crunchy-style peanut butter. If bits are not incorporated, a creamy-style peanut butter results.

Since a temperature rise occurs in the whipper or blender, the fill temperature generally is in the range 45° to 55° F. However, the preferred fill temperature is 50° F. Typically, the minimum production rate for the above described process would be 3000 lbs. per hour.

The method of manufacture of whipped peanut butter according to the invention is much improved in that it is simpler and more efficient than prior processes, especially in regard to output. Prior disclosures called for special equipment which was not standard to peanut butter manufacture and described production rates of 500-1500 pounds per hour which are not cost effective production rates.

The packaging aspect of the invention relates to the fact that the use of high density polyethylene (H.D.P.E.) or polypropylene (P.P.) containers, preferably in tub form and which are membrane sealed and capped, are of particular benefit for packaging whipped peanut butter. It is particularly preferred that the packages be thick-walled and/or opaque. It has been discovered that through the use of such packaging materials for whipped peanut butter, a significant reduction in the incidence of such textural defects product pull-away from containers and/or cracking of product occurs in comparison to the standard glass, PET containers or thin walled H.D.P.E. containers having a wall thickness of 0.020 inches or less. The thick-walled H.D.P.E. and P.P. containers in combination with a foil or other low permeability factor membrane seals also provide good protection against oxidative flavor deterioration by offering good barrier properties against oxygen transmission and shielding the whipped peanut butter from light sources. Both of these serve to promote and accelerate rancidity in peanut butter. The preferred wall thickness of both high density polyethylene and polypropylene tub containers is within the range of 0.025 and 0.055 inches.

Figure 2:
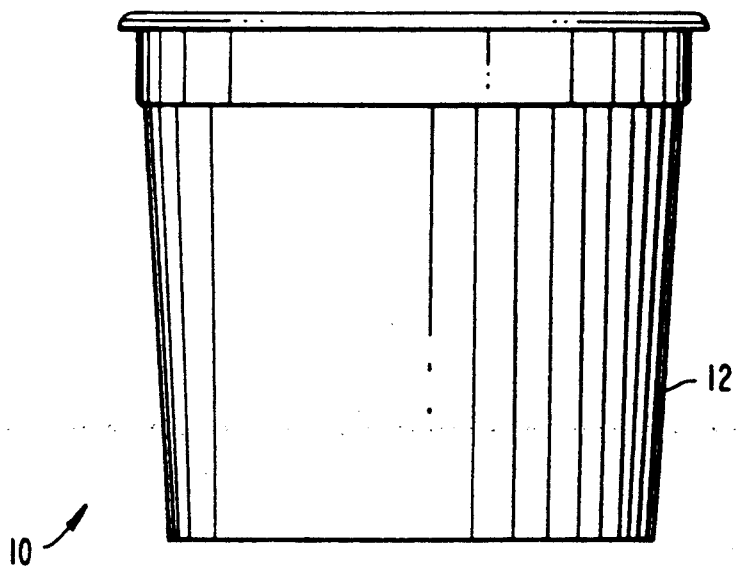
FIG. 2 is an elevational view of a container for peanut butter according to the invention.
Figure 3:
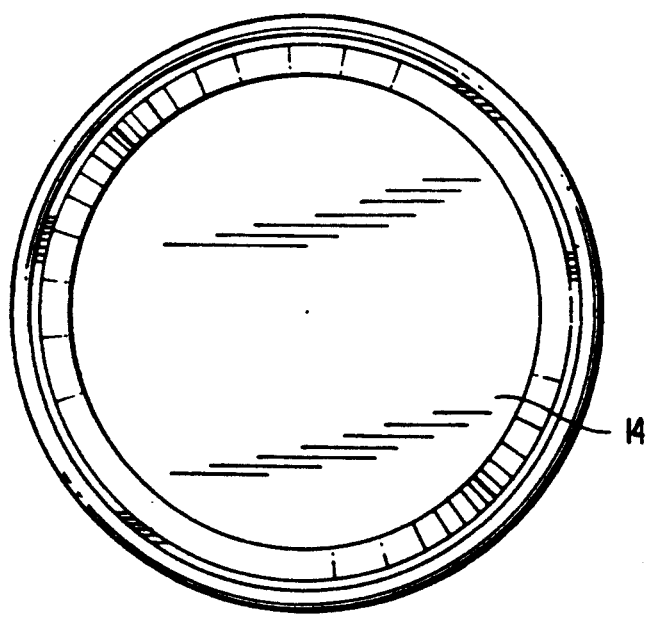
FIG. 3 is a top plan view of a container for peanut butter according to the invention.
Figure 4:
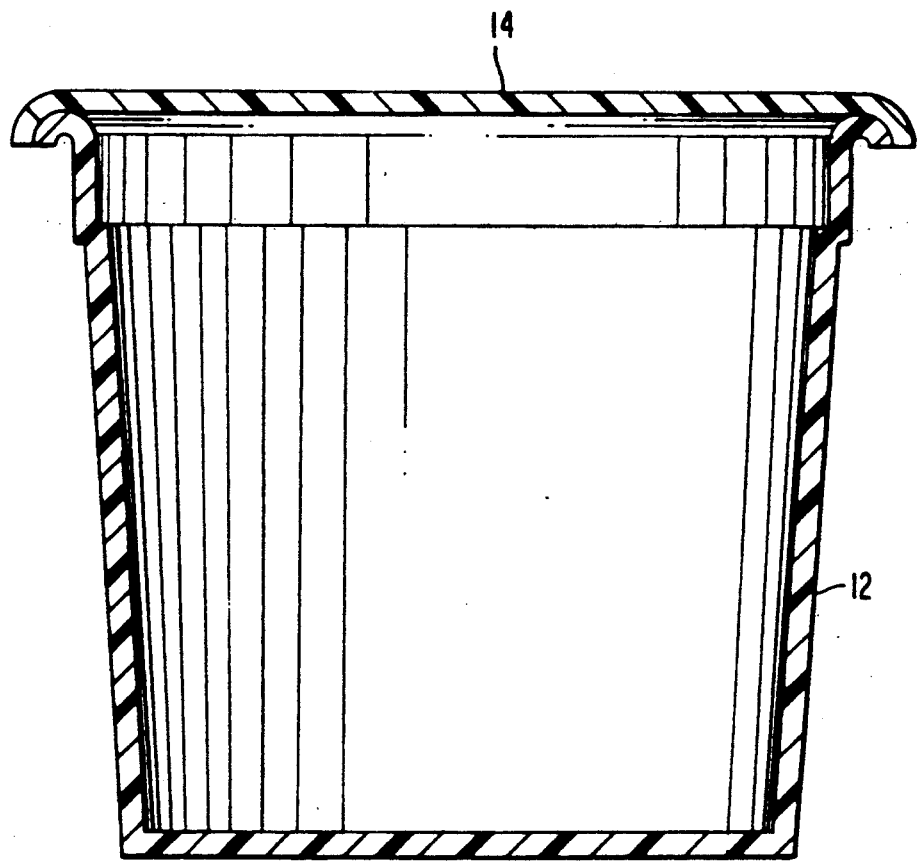
FIG. 4 is a sectional view of a container for peanut butter according to the invention.

FIGS. 2-4 illustrate the container of the invention in the form of tub 10. Tub 10 includes thick walls 12 and a cap 14.

EXAMPLE 1

872 lbs. of peanuts roasted to an L-Value of 54-56 were combined with 6.4 lbs. of sucrose 6x, 1.1 lbs. fine flour salt, 1.4 lbs. palm stearine, 0.3 lbs. Myverol 18-92 and fed through a Bauer and an Urshel mill. As the milled mixture exits the Urshel mill, a mixture of 0.5 lbs. powdered molasses dispersed in 1.7 lbs. peanut oil and 1.4 lbs. of high flavor peanut oil from Food Materials Corp. was added and the entire mixture transferred to a feed tank that was maintained at 165°-170° F. and under vacuum of 17-20 inches of Hg. After thorough mixing and deaerating, the peanut butter mixture was pumped by Moyno pump to the gas sparger where the peanut butter was sparged with inert gas, in this case nitrogen at 350 psi and product line back pressure at 275≧300 psi. The peanut butter containing the nitrogen gas was then passed through a series of S.S.H.E. votators. The first was water cooled at 100° to 120° F. The second was ammonia cooled to 50°-55° F. and the third was ammonia cooled to 38°-45° F. The cooled peanut butter on exiting the third votator was passed through an extrusion value. After passing through the extrusion value, there is a pressure drop that causes the dissolved nitrogen gas to expand into its gaseous state. The mixture of peanut butter and nitrogen gas then entered a 6×24" whipper or blender which was running at 400 rpms, with 5 psi back pressure. The peanut butter was then fed into a holding tank where if required, peanut bits were added to make crunchy style peanut butter. The finished whipped creamy or crunchy peanut butter was then fed into the filling equipment and was filled into thick-walled opaque H.D.P.E. tubs at 45° F.

EXAMPLE 2

A peanut butter is prepared according to the process described in the specification. The peanut butter includes peanuts roasted to an L-value of 54–56, 0.5 wt. % molasses and 1.5% high flavored peanut oil.

EXAMPLE 3

A whipped peanut butter containing 35% inert gas is made by the process described in the specification. The peanut butter contains 1.4% high melting vegetable oil stabilizer having a melting point of 150° F.±5%, which has been chilled during processing to 40° F. and filled at 50° F.

EXAMPLE 4

A whipped peanut butter containing 25% inert gas (nitrogen) is prepared by process described in the specification. The peanut butter contains 1.8% high melting point vegetable oil stabilizer having a melting point of 150° F.±5° F. which has been chilled during processing to 45° F. and filled at 55° F.

EXAMPLE 5

A whipped peanut butter containing 25% inert gas (nitrogen) is produced by the process described in the specification. The peanut butter contains 1.2% high melting point vegetable oil stabilizer having a melting point of 150° F.±5° F. which has been chilled during processing to 35° F. and filled at 45° F.

What is claimed is:

1. A method of aerating a peanut butter, comprising a) subjecting at a temperature of from about 140° to about 170° F. a molten mass of peanut butter to pressures of from about 200 to about 500 psi, b) rapidly deep chilling the mass to a temperature within the range from about 35° to about 50° F., c) after the 200 to 500 psi pressure has been imposed but prior to culmination of the deep chilling step, injecting inert gas into the molten mass, and d) passing the chilled mass through a narrow orifice from one side to a second side to create a pressure drop, the first side of said orifice having the pressure of 200 to 500 psi and the second side of said orifice having a pressure of from 0 to 80 psi.

2. The method of claim 1 wherein said inert gas is injected at a pressure of from 250 to 550 psi.

3. The method of claim 1 wherein the pressure at said second side of the orifice is from 0 to 30 psi.

4. The method of claim 1 wherein said inert gas is nitrogen.

5. The method of claim 1 wherein the 200 to 500 psi pressure is created by a Moyno pump.

6. The method of claim 1 wherein said inert gas is injected to the extent of from 10 to 50% by volume of the final product.

7. The method of claim 1 wherein said inert gas is injected to the extent of from 20 to 30% by volume of the final product.

8. The method of claim 1 further comprising whipping the mass obtained therein in a whipper.

9. The method of claim 8 further comprising placing the mass in an agitated filler hopper tank and adding peanut bits.

10. The aerated peanut butter made by the process of claim 1.

11. The method of claim 1 wherein prior to injection of the gas, the molten mass of peanut butter is fed into a vacuum-fitted tank which removes inert gases therefrom.

12. The method of claim 1 wherein from 1.0 to 1.4% of high melting vegetable oil stabilizer is included.

13. A method of making an aerated peanut butter, comprising injecting from 10 to 50% by volume of an inert gas into a paste comprising peanuts roasted to an L-value of from 40 to 60 and wherein prior to injecting the inert gas, the paste is subjected at a temperature of from about 140° to about 170° F. to pressures of from about 200 to about 500 psi, b) the paste is rapidly deep chilled to a temperature within the range of from about 35° to about 50° F., said gas injection occurring after the 200 to 500 psi pressure has been imposed but prior to culmination of the deep chilling step c) the chilled mass is passed through a narrow orifice from one side to a second side to create a pressure drop, the first side of said orifice having the pressure of 200 to 500 psi and the second side of said orifice having a pressure of from 0 to 80 psi.

14. The method of claim 13 wherein from 5 to 100% of the peanuts in the paste are roasted to an L-value of from 40 to 60.

15. The method of claim 14 wherein from 20 to 95% of the peanuts in the paste are roasted to an L-value of from 40 to 60.

16. The method of claim 15 wherein from 50 to 80% of the peanuts in the paste are roasted to an L-value of from 40 to 60.

17. The method of claim 13 wherein said inert gas is injected at a pressure of from 250 to 550 psi.

18. The method of claim 13 wherein said insert gas is nitrogen.

19. The aerated peanut butter made by the process of claim 13.

20. The method of claim 13, further comprising adding to the roasted peanuts powdered molasses.

21. The aerated peanut butter made by the process of claim 20.

22. A method of making an aerated peanut butter comprising injecting into a paste formed from peanuts and powdered molasses from 10 to 50% by volume of an inert gas.

23. The method of claim 22 wherein said powdered molasses constitutes from 0.1 to 1.5% of the peanut butter based on the weight of the final product.

24. The peanut butter made by the method of claim 22.

25. The method of claim 23 wherein said paste further comprises flavored peanut oil at from 0.5 to 3%.

26. The method of claim 22 wherein the paste comprises peanuts roasted to an L-value of from 40 to 60.

27. The peanut butter made by the method of claim 26.

28. An aerated peanut butter comprising a paste formed from peanuts, powdered molasses and from 10 to 50% by volume of an inert gas.

* * * * *